No. 667,785. Patented Feb. 12, 1901.
A. LIETZ.
COMPASS DEVIATION FINDER.
(Application filed June 9, 1898.)
(No Model.)
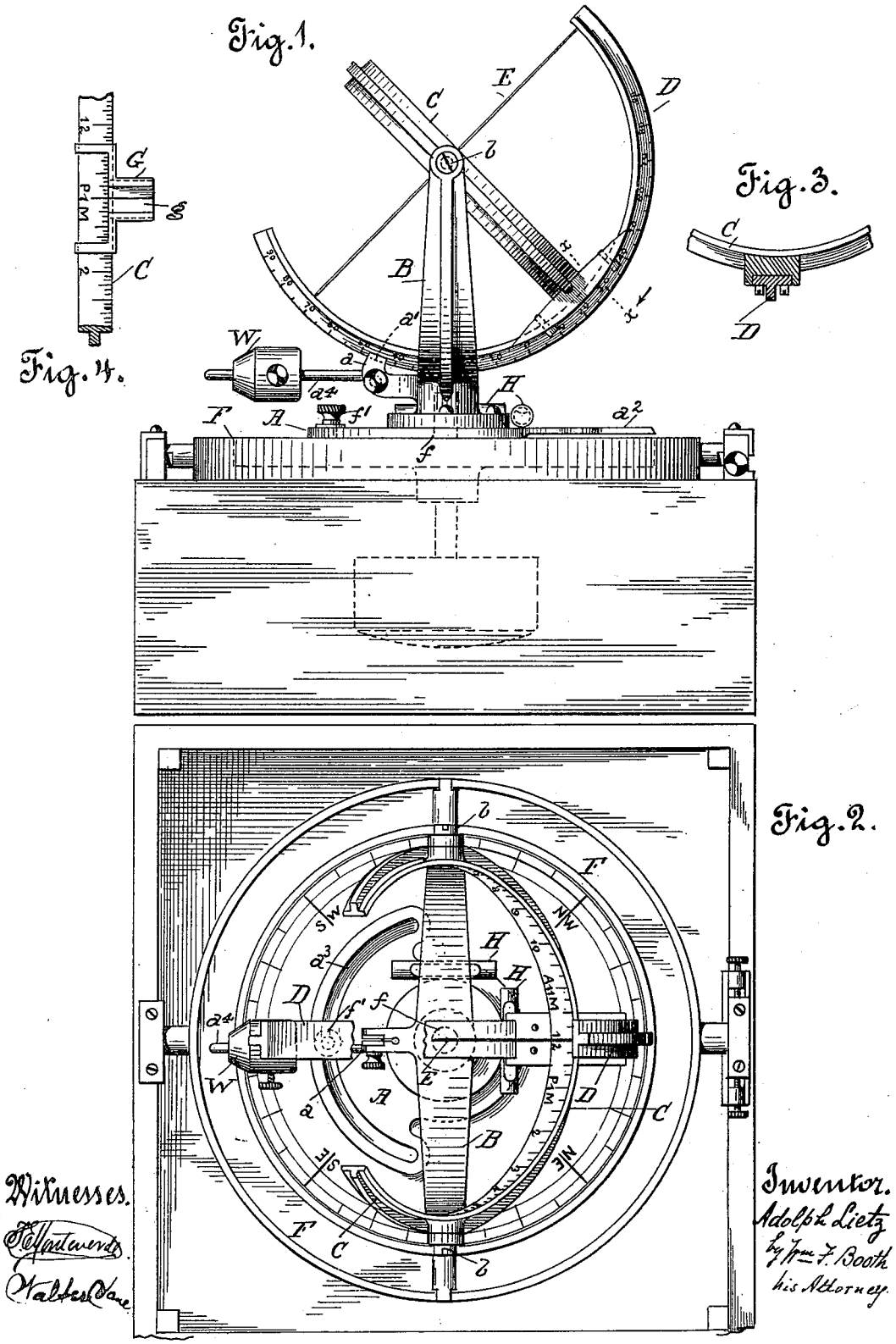

UNITED STATES PATENT OFFICE.

ADOLPH LIETZ, OF SAN FRANCISCO, CALIFORNIA, ASSIGNOR TO THE A. LIETZ COMPANY, OF SAME PLACE.

COMPASS-DEVIATION FINDER.

SPECIFICATION forming part of Letters Patent No. 667,785, dated February 12, 1901.

Application filed June 9, 1898. Serial No. 682,983. (No model.)

*To all whom it may concern:*

Be it known that I, ADOLPH LIETZ, a citizen of the United States, residing at the city and county of San Francisco, in the State of California, have invented certain new and useful Improvements in Compass-Deviation Finders; and I do hereby declare the following to be a full, clear, and exact description of the same.

My invention relates to that class of instruments for finding or determining the variation or deviation of the compass, in which the true meridian is ascertained by the adjustment of connected latitude and time arcs or rings to the latitude of the place where the observation is being taken and to the apparent time.

The object of my invention is to simplify instruments of this character and to accomplish the result of ascertaining the deviation by bearings of the heavenly bodies, principally the sun, without the use of tables in a simple and accurate manner.

My invention is embodied in the novel parts and arrangement and combinations of parts hereinafter described, and particularly set forth in the claims.

Figure 1 is an elevation of my deviation-finder. Fig. 2 is a plan of same. Fig. 3 is a detail of the connection between the two arcs. Fig. 4 is a detail of the reading-card on the hour-arc.

A is a base-plate, from which rise standards of suitable shape. (Here shown as a forked casting B.) In these standards is pivoted at $b$ the arc C, which is divided into hours and subdivisions of equal spaced distances, beginning with the noon-hour in the center, and thence up each side to the extremities. This arc is the hour-arc. D is another arc graduated in degrees of latitude, its two quadrants being numbered from "0" to "90," one representing the southern and the other the northern latitude. This arc is the latitude-arc, and it is secured to the hour-arc in a plane at right angles thereto and passes through the noon-hour of said arc.

In the line of a chord of the latitude-arc and fixed to said arc is a thread or wire E, in position to throw a shadow on the hour-arc.

On the base-plate A is a clamp $a$, through which the latitude-arc plays, and upon said clamp is a fixed index-mark $a'$.

The instrument can either be placed directly on top of the compass or on a dumb-card F, which is hung in rings like the compass.

In manipulating the instrument it is only necessary to set the latitude-arc so that the mark representing the latitude of the place where the observation is being taken, which latitude is known or has already been ascertained, shall aline with the fixed index-mark $a'$. Then fix it by the clamp $a$. Now turn the instrument in a horizontal plane until the shadow of the thread or wire E falls upon that division of the hour-arc which corresponds with the apparent time, which has been ascertained. The latitude-arc and the thread or wire will now lie in the plane of the true meridian, from which the deviation of any compass can be readily ascertained by comparing it with the plane of the latitude-arc as thus set.

In order to find the magnetic meridian, the base-plate A is mounted on the compass or card on a central pivot $f$, and said plate is provided with a pointer $a^2$. It has also a slot $a^3$, in which works a thumb-screw $f'$. Now turn the base-plate on its pivot until its pointer indicates the point on the compass or card corresponding to the magnetic variation of the place where the observation is being taken, and there clamp said plate by the thumb-screw $f'$. Then manipulate the instrument as before, and while the latitude-arc will lie in the plane of the true meridian the course indicated by the compass or dumb-card is magnetic.

In order to see the shadow cast by the thread or wire E with greater certainty than its appearance on the hour-arc affords, I fit to said arc a sliding bracket G, carrying a lined card $g$, as is shown in Fig. 4. This being set properly to correspond to the division of apparent time, the shadow of the thread or wire being continued upon said card can be seen with certainty, thus avoiding possible error of reading. As the system of connected arcs must be set to correspond to different latitudes, it is obvious that by reason of its changing position the nicely-hung compass or dumb-card will be thrown out of balance and will not remain horizontal. To obviate this, I extend from the base-plate A an arm $a^4$, upon which I set a slidable weight W. By setting this weight the proper balance may be maintained, as will be indicated by the levels H.

This instrument thus admits of finding the true or the magnetic meridian or bearings therefrom by means of a sun-dial adjustable to the change of latitude and so constructed that the divisions of the hour-arc are equally spaced.

Having thus described my invention, what I claim as new, and desire to secure by Letters Patent, is—

1. In a compass-deviation finder, the combination of a standard, an hour-arc piece movably supported thereby, a latitude-arc piece secured to the hour-arc piece, a shadow-throwing means, a clamp-arm extending from said standard and having an upwardly-projecting bifurcated portion between the parts of which a rib on said latitude-arc piece engages and works, and means for forcing said clamp parts together to clamp said rib and hold said arc-pieces in adjusted positions, substantially as described.

2. The combination with a graduated scale, and means for throwing a shadow on said scale, of a slide supporting a reading-card beside the scale in position to receive the shadow, said card having a mark or the like adapted to register with the shadow, substantially as described.

In witness whereof I have hereunto set my hand.

ADOLPH LIETZ.

Witnesses:
WALTER F. VANE,
D. B. RICHARDS.